(12) United States Patent  
Grzelakowski et al.

(10) Patent No.: US 11,247,179 B2  
(45) Date of Patent: Feb. 15, 2022

(54) METHOD OF PREPARING MEMBRANES

(71) Applicant: APPLIED BIOMIMETIC A/S, Nordborg (DK)

(72) Inventors: Mariusz Piotr Grzelakowski, Cincinnati, OH (US); Yan Zhang, Cincinnati, OH (US)

(73) Assignee: APPLIED BIOMIMETIC A/S, Nordberg (DK)

( * ) Notice: Subject to any disclaimer, the term of this patent is extended or adjusted under 35 U.S.C. 154(b) by 693 days.

(21) Appl. No.: 15/775,765

(22) PCT Filed: Nov. 21, 2016

(86) PCT No.: PCT/EP2016/078338  
§ 371 (c)(1),  
(2) Date: May 11, 2018

(87) PCT Pub. No.: WO2017/085322  
PCT Pub. Date: May 26, 2017

(65) Prior Publication Data  
US 2018/0345226 A1 Dec. 6, 2018

(30) Foreign Application Priority Data  
Nov. 20, 2015 (GB) .................................... 1520466

(51) Int. Cl.  
*B01D 67/00* (2006.01)  
*C08L 81/06* (2006.01)  
(Continued)

(52) U.S. Cl.  
CPC ...... *B01D 67/0013* (2013.01); *B01D 67/0011* (2013.01); *B01D 67/0016* (2013.01);  
(Continued)

(58) Field of Classification Search  
CPC .................................................. B01D 67/0013  
See application file for complete search history.

(56) References Cited

U.S. PATENT DOCUMENTS

| 4,787,976 A | 11/1988 | Parham et al. |
| 6,495,043 B1 | 12/2002 | Heijnen |

(Continued)

FOREIGN PATENT DOCUMENTS

| CN | 104587840 A | 5/2015 |
| DE | 41 17 501 A1 | 12/1992 |

(Continued)

OTHER PUBLICATIONS

Biscarat, Jennifer, et al., "Gas permeability properties of gelatin/polyetheramine blend membranes made without organic solvent," *Separation and Purification Technology*, 12, No. 33-39 (2015).

(Continued)

*Primary Examiner* — Larry W Thrower  
(74) *Attorney, Agent, or Firm* — Christensen, Fonder, Dardi & Herbert PLLC

(57) ABSTRACT

A method of preparing a membrane comprising the steps of: a) mixing together a membrane-forming polymer, a water-soluble polyetheramine, and a solvent, said mixture containing no component which will react chemically with the polyetheramine; and b) casting said mixture to form the polymer into a solid membrane.

17 Claims, 11 Drawing Sheets

(51) Int. Cl.
*B01D 71/52* (2006.01)
*B01D 69/02* (2006.01)
*B01D 71/34* (2006.01)
*B01D 71/68* (2006.01)
*B29C 41/30* (2006.01)
*C08J 5/18* (2006.01)
*B29K 27/00* (2006.01)
*B29K 81/00* (2006.01)
*B29L 31/00* (2006.01)

(52) U.S. Cl.
CPC ......... *B01D 67/0088* (2013.01); *B01D 69/02* (2013.01); *B01D 71/34* (2013.01); *B01D 71/52* (2013.01); *B01D 71/68* (2013.01); *B29C 41/30* (2013.01); *C08J 5/18* (2013.01); *C08L 81/06* (2013.01); *B01D 2323/12* (2013.01); *B01D 2323/18* (2013.01); *B01D 2325/34* (2013.01); *B29K 2027/16* (2013.01); *B29K 2081/06* (2013.01); *B29L 2031/755* (2013.01); *C08G 2650/50* (2013.01); *C08J 2381/06* (2013.01); *C08J 2471/02* (2013.01)

(56) References Cited

U.S. PATENT DOCUMENTS

| | | |
|---|---|---|
| 2007/0154651 A1 | 7/2007 | Weiss et al. |
| 2012/0223014 A1 | 9/2012 | Boam et al. |
| 2012/0318729 A1 | 12/2012 | Yip et al. |

FOREIGN PATENT DOCUMENTS

| | | |
|---|---|---|
| JP | 2004-224989 A | 8/2004 |
| JP | 2009-112895 A | 5/2009 |
| WO | WO 01/25283 A1 | 4/2001 |
| WO | WO 02/46298 A1 | 6/2002 |
| WO | WO 02/46299 A1 | 6/2002 |
| WO | WO 2010/111755 A2 | 10/2010 |

OTHER PUBLICATIONS

Gassara, Sana, et al., "Pore size tailoring of poly(ether imide) membrane from UF to NF range by chemical post-treatment using aminated oligomers," *Journal of Membrane Science*, 436, pp. 36-46 (2013).

Jalal, Taghreed A., et al., "Reactive phase inversion for manufacture of asymmetric poly(ether imide sulfone) membranes," *Reactive & Functional Polymers*, 85, pp. 1-10 (2014).

Lim, Chunwon, et al., "Effect of polyether diamine on gas permeation properties of organic-inorganic hybrid membranes," *J Sol-Gel Sci Techn*, 43, pp. 35-40 (2007).

Phomdum, Pattama, et al., "Preparation and properties of poly(ether imide) ultrafiltration membrane modified with polyether diamine," *Advanced Materials Research*, vols. 931-932, pp. 63-67 (2014).

Siddique, H., et al., "Pore preserving crosslinkers for polyimide OSN membranes," *Journal of Membrane Science*, 465, p. 138-150 (2014).

The Jeffamine® Polyetheramines, Huntsman, Oct. 21, 2020 https://pdf4pro.com/view/the-jeffamine-polytheramines-huntsman-24de09.html (6 pgs.).

Yan, Tao, et al., "Iron catalyzed direct alkylation of amines with alcohols," *Nature Communications*, vol. 5, No. 26, pp. 1-7 (Nov. 2014).

Burton, Bruce, et al., "Epoxy Formulations Using Jeffamine Polyetheramines," retrieved from the internet: http://www.huntsman.com/portal/page/portal/performance_products/MediaLibrary/global/files/, 105 pages (Apr. 27, 2005).

METHOD OF PREPARING MEMBRANES

PRIORITY CLAIM

The present application is a National Phase entry of PCT Application No. PCT/EP2016/078338, filed Nov. 21, 2016, which claims priority from Great Britain Patent Application Number 1520466.2, filed Nov. 20, 2015, the disclosures of which are hereby incorporated by reference herein in their entirety.

FIELD OF THE INVENTION

This invention relates to a method of preparing membranes. The membranes formed have advantageous properties and are believed to be novel.

BACKGROUND OF THE INVENTION

Synthetic or natural polymers typically used for membrane formation include polysulfone (PS), polyethersulfone (PES), polyvinylidene difluoride (PVDF), polyacrylonitrile (PAN) and polyethylene (PE), amongst others. These polymers are formed into membranes by various casting techniques. Conventional ultrafiltration polymeric membranes operating in industrial, laboratory or household environments are generally characterized by surface pore size in the broad range of 2 microns to 50 nanometers, and deliver a wide range of fluxes. If the surface pores of the membrane skin layer are the smallest pores in the membrane, the surface pore size determines the molecular cut-off of the membrane (commonly understood by those skilled in the art as 90% retention of solute of given molecular weight by the separation membrane). The relationship between membrane pore size and the molecular cut-off is not standardized but industry has set up ranges and guidelines for pore size, molecular cut-off, and retention of solutes. As an example Millipore has issued guidelines entitled "Protein Concentration and Diafiltration by Tangential Flow Filtration", which categorises filtration processes using interchangeably pore size and molecular cut-off. The relationship between pore size and liquid flux through the membrane is characterized by steep reduction of flow with decrease of the pore size of the membrane.

Generally ultrafiltration filtration membranes which are characterized by a cut-off range of 50 nm/100 kDa remove some viruses and bacteria. However, despite the virus removal reported for microfiltration (MF) and ultrafiltration (UF) membranes, none of the membranes on the market are approved for purification of drinking water on microbiologically unsafe feed. This may be due to the fact that some bacteria are smaller than 1-2 micron in size (500 nm) and viruses as small as 17 nm (for example the Porcine circovirus, a single-stranded DNA virus (class II)) and the smallest DNA bacteriophage, the Phi-X174 phage (4 kb), which is thought to be larger than Hepatitis B virus (HBV-30-42 nm), can be observed.

Retention in the UF process is driven by both seeding and charge rejection. Therefore, it can only be successfully applied to remove bacteria and viruses (as well as other small solutes) if the pore size of the membrane is smaller than the smallest of the particles to be removed.

Many different ways of making membranes are known. In casting processes, the membrane-forming polymer, which is itself insoluble in water, is dissolved in a solvent which is soluble in water. The resulting solution is cast into a quenching tank containing water, whereupon the solvent dissolves in the water and the polymer precipitates out into the solid phase. The final form of the membrane depends on the process conditions and on the components of the solution being cast, and the finished membrane will generally have a surface layer with rather different characteristics from the main body of the membrane. Important performance parameters of the membrane are the potential flux of liquid through the membrane, and the molecular weight cut-off point, i.e. the maximum molecular weight of molecules which are able to pass through the membrane. Amongst other things, the porosity, density and uniformity of both the surface layer and the body of the membrane are important in determining these performance parameters, and it is particularly important to prevent the formation of defects, particularly macrovoids, which will damage membrane performance.

It is known to use pore-forming additives, for example LiCl and high molecular weight organic additives such as polyvinylpyrrolidone (PVP) or polyethylene glycol (PEG, also known as polyethylene oxide, PEO), to help control pore formation. For example WO 2011/069050 mentions (but does not demonstrate) the use of a polymeric additive which may be selected from polyalkylene glycols, polyalkylene oxides, polyoxoalkylenes, acrylamides, catecholamines and polyetheramines. In practice, many of these additives do not work, and tailoring of the properties of membranes remains a difficult task. Lalia et al, Desalination, 326 (2013) 77-95 is a review article discussing various processes, and concludes "Despite the fact that extensive knowledge exists on how to "tailor" membrane pore structure including its surface properties and cross-section morphology by selection of appropriate fabrication methods, there is still a challenge to produce reliable membranes with anti-fouling properties, chemical resistance, high mechanical strength with high flux and selectivity."

It is known to use polyetheramines in the post-treatment of pre-formed membranes, see for example WO 2007/078880 and CN 104587840, and it is known to use polyetheramines in the casting process under conditions where they react chemically with components of the casting mixture, or dope. Thus for example U.S. Pat. No. 4,787,976 discloses a method for preparing membranes which involves the use of a pre-polymer which is reacted with a polyetheramine. In this process, a casting solution is formed which includes a prepolymer polymerizable upon contact with a coagulating liquid, and a polymer that will not react readily with the prepolymer and is substantially insoluble in the coagulating liquid. The coagulating liquid may be water containing a polyamine. The polyamine reacts with the prepolymer on addition of the coagulating liquid, and solid polymer is precipitated simultaneously with the addition of the polyamine. Lim et al, J. Sol-Gel. Sci. Techn. (2007) 43, 35-40, describes reacting 3-isocyanatopropyltriethoxysilane (IPTS) with diamines containing polyether segments, and subsequently forming composite membranes. Jalal et al, Reactive & Functional Polymers (2014), 85, 1-10, describes poly(ether imide sulfone) membranes modified by the addition of an epoxy-modified polysilsesquioxane which reacts with added diamine. Gassara et al, J. Mem. Sci., 2013, 436, 36-46, describes treating a poly(ether imide) membrane using a chemical post-treatment with amino oligomers. Phomduma et al, Ad. Mat. Res., 2014, 931-932, pp 63-67 describes the post-formation treatment of a poly(ether imide) membrane with an aqueous solution of polyether diamine-PEO. Siddique et al, J. Mem. Sci. 465 (2014) describes the post-formation crosslinking of polyimide membranes using Jeffamine 400, a polyetheramine. It is also known to use polyetheramines in non-casting processes, see for example WO 2002/046298, WO 2002/046299 and JP 2004/224989.

We have now found that improved membranes can be formed by including a specific class of polyetheramine in a casting mixture which contains no component which is reactive with the polyetheramine. The resulting membranes have a dense, uniform surface layer, a uniform, highly permeable body, and a low incidence of defects.

SUMMARY OF THE INVENTION

In a first aspect, the invention provides a method of preparing a membrane comprising the steps of:
a) mixing together a membrane-forming polymer, a water-soluble polyetheramine, and a solvent, said mixture containing no component which will react chemically with the polyetheramine; and
b) casting said mixture to form the polymer into a solid membrane.

In a second aspect, the present invention provides a method of preparing a membrane comprising the steps of:
a) mixing together a membrane-forming polymer, a polyetheramine having a molecular weight of up to 2,500, and a solvent, said mixture containing no component which will react chemically with the polyetheramine; and
b) casting said mixture to form the polymer into a solid membrane.

The membranes prepared by the process of the present invention are believed to be novel, and the invention therefore also provides these membranes per se.

DETAILED DESCRIPTION OF THE INVENTION

The present invention is based upon the surprising observation that including a specific polyetheramine in the casting solution when casting a membrane results in a membrane with improved properties even when the casting solution contains no components which are reactive with the polyetheramine. This effect is not observed when using alternative polyetheramines.

The Polyetheramine

A polyetheramine is a polyether with at least one primary or secondary amine group attached to the polyether backbone, generally at the end of the polymer chain. "Polymer" in this context should be understood to include dimer, trimer, and oligomer. Polyetheramines include mono-, di-, tri- or multi-functional primary and secondary amines. The polyether typically contains ethylene oxide and/or propylene oxide monomer units. Many are commercially available, for example products manufactured by Huntsman under name JEFFAMINE®, or BASF D-T 200 through 5000 (or Baxxodur®).

Some polyetheramines are water-soluble, and these are used in the first aspect of the invention, and preferred in the second aspect of the invention. Preferably the solubility of the polyetheramine is at least 0.1% w/v, especially at least 0.2% w/v, at 21° C. Most preferably, the polyetheramine is miscible with water at 21° C.

Solubility of polyetheramines in water can be measured using the standard method of Dynamic Light Scattering, and a suitable protocol is described below. DLS detects and monitors the size and number of any particles present when the polyetheramine and water are mixed. Polyetheramines can be slow to dissolve in water, but solutions of those which are soluble do not phase separate over time on standing once the solution has been formed.

Polyetheramines suitable for use in the present invention include those containing two or more ethylene oxide and/or propylene oxide monomer units and at least one, for example 1, 2 or 3, primary or secondary amine units —NHX where X is a hydrogen atom or a $C_{1-4}$ alkyl group, for example a methyl, ethyl, n-propyl or isopropyl group. The molecular weight of the polyetheramine will of course vary depending on the number of monomer units present. In the second aspect of the invention, and preferably in the first aspect of the invention, the molecular weight is up to 2,500, for example up to 2,000, or up to 1,500, or up to 1,000. It may for example be in the range of from 130 to 2,500, for example 130 to 2,000, for example 150 to 1,000, for example 150 to 600. In general, there is a correlation between water-solubility and molecular weight of polyetheramines: the molecular weight will influence the hydrophilicity of the polyetheramine, and polyeramines having a higher content of ethylene oxide or lower content of propylene oxide monomer units will generally be more hydrophilic and therefore water-soluble.

The polyetheramine may for example be a mono- or di-amine having the schematic formula:

or a mono-, di- or tri-amine having the schematic formula:

in which each of Y, Y' and Y" independently represents an end group at least one of which includes a primary or secondary amine group, and PAO represents a polyalkyleneoxide chain consisting of at least two ethylene oxide and/or propylene oxide monomer units. Suitable amine-containing end groups include (i) —NHX groups in which X represents a $C_{1-4}$ alkyl group, for example a methyl group, or, especially, a hydrogen atom, and (ii) $C_{1-4}$ alkyl groups which may be substituted by an —NHX group or interrupted by an —NH— group. If an end group does not contain an amino group, it may for example be a hydrogen atom, a $C_{1-4}$ alkyl group, an —OH group, or an —$OC_{1-4}$ alkyl group. The PAO chain may be straight-chain, in which case the polyetheramine may have the schematic formula:

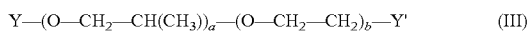

in which a represents the number of propylene oxide (PO) monomer units present and b represents the number of ethylene oxide (EO) monomer units present, it being understood that either a or b can be zero, and that if both PO and EO monomer units are present these may be arranged in random, alternate or block sequence. Alternatively, the PAO chain may be branched, in which case the polyetheramine may have the general formula:

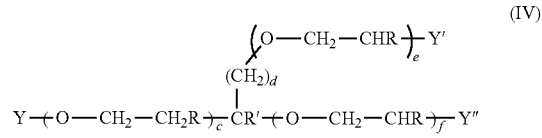

in which R represents a hydrogen atom or a methyl group, R' represents a hydrogen atom, a methyl or an ethyl group, d is 0 or 1, and c, e and f are the numbers of PO and/or EO monomer units present.

Commercially available polyetheramines include compounds of the following formulae:

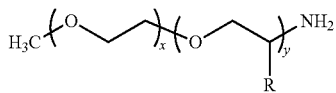
(V)

in which R is H or CH₃, and x and y are the numbers of EO/PO monomer units in the polyether chain. Huntsman's JEFFAMINE® M series polyetheramines are of this type;

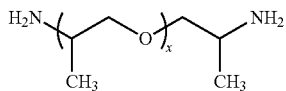
(VI)

in which x is the number of PO monomer units in the polyether chain. Huntsman's JEFFAMINE® D series polyetheramines are of this type;

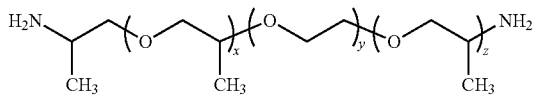
(VII)

in which x and z are the number of PO monomer units in two blocks in the polymer chain, and y is the number of EO monomer units in the polyether chain. Huntsman's JEFFAMINE® ED series polyetheramines are of this type;

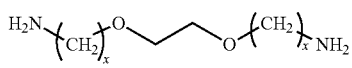
(VIII)

in which x is 2 or 3. Huntsman's JEFFAMINE® EDR series polyetheramines are of this type;

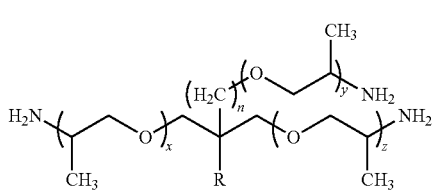
(IX)

in which x, y and z together represent the total number of PO monomer units present in the branched chain polymer, n is 0 or 1, and R is hydrogen, methyl or ethyl. Huntsman's JEFFAMINE® T series polyetheramines are of this type.

In the above products, one or more NH₂ end groups can be converted into a secondary amine group, for example:

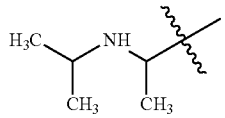
(X)

Huntsman's JEFFAMINE® SD and ST series polyetheramines are of this type.

Specific compounds of the above types available under the JEFFAMINE Trade Mark include the following:

Monoamines: M-600 (XTJ-505), M-1000 (XTJ-506), M-2070.

Diamines: D-230, HK-511, D-400, XTJ-582, D-2000, XTJ-578.

Diamines (EO-Based): ED-600 (XTJ-500), ED-900 (XTJ-501), ED-2003 (XTJ-502).

Diamines (PTMEG-Based): XTJ-542, XTJ-548, XTJ-559.

Diamines (High Reactivity): EDR-148 (XTJ-504), EDR-176 (XTJ-590).

Triamines: T-403.

Secondary Amines: SD-231 (XTJ-584), SD-401 (XTJ-585), SD-2001 (XTJ-576), ST-404 (XTJ-586).

Experimental Amines: XTJ-435, XTJ-436, XTJ-566, XTJ-568.

In one embodiment, the use of a polyetheramine of the formula (IX) above is preferred. One preferred compound of this type is the compound in which the number of moles of PO is between 5 and 6, giving an approximate molecular weight of 440. This compound is commercially available as Jeffamine™ T403. In another embodiment, the use of a polyetheramine of the formula (VI) is preferred. One preferred compound of this type is the compound in which x in the formula (VI) is on average from 6 to 7, giving an approximate molecular weight of 430. This compound is commercially available as Jeffamine™ D400. Other specific Jeffamine™ polyetheramines which may be used in the process of the invention include M600, M1000, ED600 and ED2003.

The Polymer

Any polymer typically used for making membranes may be used in the present invention, provided that it is not reactive with the polyetheramine. Polyimide (PI) and polyetherimide (PEI) polymers which are commonly used for making membranes are reactive with polyetheramines and so are not suitable for use in the present invention. Suitable polymers include for example:

Cellulose acetate/triacetate
Polyamide, including aromatic polyamide
Polypiperazine
Polybenzimidazoline
Polyol, including polyphenol
Polyacrylonitrile (PAN)
Polyethersulfone (PES)
Polysulfone (PS)
Poly(phthalazinone ether sulfone ketone) (PPESK)
Poly(vinyl butyral)
Polyvinylidene fluoride (PVDF)
Poly(tetrafluoroethylene) (PTFE)
Polypropylene (PP)
Polyethylene (PE)
Polyetheretherketone (PEEK)

Especially preferred polymers are PS, PES, PVDF, PAN and PE, with PS, PES and PVDF being particularly preferred.

The Solvent

The solvent or mixture of solvents used will of course depend on the nature of the polymer and any additives present. Generally, the solvent should dissolve the polymer and the additives, and should be miscible with the non-solvent (for example water or an alcohol) used in the quench bath. Any of the solvents known for use in membrane casting processes may be used. Suitable solvents include, for example, DMF, NMP, dimethylacetamide, acetone, DMSO and THF. Mixtures of solvents may be used. In addition, the casting mixture may contain a non-solvent, of which water is the most common example, although other non-solvents, for example alcohols, for example $C_{1-4}$ alkanols, or glycol ethers, for example methoxyethanol, ethoxyethanol or propoxyethanol, especially methoxyethanol, may be used. Such non-solvents are generally included to act as viscosity regulators, as viscosity can be important in casting configuration, and may affect speed of precipitation.

Additional Casting Additives

As well as the polyetheramine additive, the casting mixture may contain any additional additives known in the art. So-called "pore forming" additives are typically added to membrane casting dope in order to increase the porosity and trigger certain membrane morphology. Inorganic additives such as LiCl may be used. Alternatively, hydrophobic polymers or block co-polymers, for example polyvinylpyrrolidone (PVP) and polyethylene glycol (PEG) may be added. As an example, it is known that addition of up to 10% of PVP to formulations utilizing PS, PES or PVDF as membrane-forming polymer increases pore size and allows the achievement of higher trans-membrane fluxes. Any such additives may be used in the present invention in addition to the polyetheramine.

The casting mixture should not contain components which are reactive with the polyetheramine. Specifically, it should not contain reactive monomers or pre-polymers which will cross-link or otherwise react with the polyetheramine.

The Casting Process

Step (a) of the process of the invention involves mixing together the polymer, the polyetheramine, the solvent, and any additional components, to form a casting solution, or dope. The dope may be a clear solution, or it can be an emulsion or suspension. The weight ratio of polyetheramine to polymer is an important parameter which determines the pore structure of the finished membrane. It may for example be in the range of from 1:0.1 to 1:200 w/w, although preferably the polymer is present in a weight at least equal to that of the polyetheramine. The weight ratio may for example be 1:1 to 1:100, for example 1:2 to 1:50, especially 1:5 to 1:40, w/w.

The concentration of polymer in the solvent is suitably in the range of from 1 to 80, for example 4 to 60, for example 8-35, especially from 12 to 21, % w/w.

The concentration of polyetheramine in the solvent is suitably in the range of from 1 to 90, for example 1 to 5, especially 0.01 to 3, % w/w.

Step (a) may be carried out simultaneously with step (b), but in one preferred embodiment step (a) is carried out as a first step, and once this is completed then step (b) is carried out as a subsequent step.

Step (b) involves casting the mixture of step (a) to form the membrane, and may involve any known casting technique. Casting is the precipitation of the membrane-forming polymer from the mixture of the polymer and additives in the solvent. Phase inversion may be driven by:

Immersion precipitation—where polymer and additives are dissolved in the solvent, and subsequently immersed into a non-solvent medium, thus forming the membrane. The most common non-solvent medium used is water, but other liquids for example alcohols, may also be used.

Thermal precipitation—where polymer is dissolved in the solvent at a given temperature, cast, and allowed to cool to form a precipitated membrane.

Evaporation induced precipitation—where polymer and additives are dissolved in the solvent and volatiles are allowed to evaporate after the solution is cast onto a support or running belt.

Electrospinning.

Stretching.

Track etching.

Interfacial polymerization.

Preferably step (b) comprises immersing the mixture produced in step (a) in a medium in which the polymer is insoluble, especially an aqueous medium.

The membrane may be cast onto a backing or support, for example a fabric, typically nonwoven polyester or polypropylene, although any form of backing may be used. Casting can be achieved to form membranes in various configurations, for example flat-sheet membranes, made using a doctor blade or a diecoater, involving extrusion of polymer solution through extrusion knives; hollow fiber membranes, where viscous dope is pushed through an extrusion nozzle into quenching solution/solutions on the outside and inside of the fiber; tubular membranes; or Fibreplate™-type membranes.

The solvent is generally removed as part of the casting process.

After the membrane has been formed, any desired post-formation steps may be carried out. For example, the surface of the membrane may be functionalised in any desired way, and various coatings may be applied if desired. The membranes find utility in a wide range of applications, for example ultrafiltration for drinking water (bacteria and virus removal), reverse osmosis pre-treatment, waste water, food processing applications, and protein filtration. In one preferred embodiment, the membrane according to the invention is supplied with a conventional coating for a nanofiltration or reverse osmosis membrane, thus acting as a support for such a membrane. Nanofiltration and reverse osmosis membranes are used in high pressure conditions which, when using conventional membranes, can lead to significant compaction, and hence reduction in flow.

The process of the invention results in a membrane with improved rejection capabilities, specifically exceptionally high water permeability at a given molecular cut off, and reduction of fouling at the surface of the membrane. The invention allows precise control of the size, number and architecture of pores, thus allowing for the design of membranes for specific applications. The invention thus finds utility in the preparation of low energy, small-pored, high-porosity, anti-fouling/easy-cleaning, and high permeability ultrafiltration membranes.

The first aspect of the invention is the subject of the claims. The second aspect of the invention may be characterized by the following clauses.

1. A method of preparing a membrane comprising the steps of:

a) mixing together a membrane-forming polymer, a polyetheramine having a molecular weight of up to 2,500, and a solvent, said mixture containing no component which will react chemically with the polyetheramine; and b) casting said mixture to form the polymer into a solid membrane.

2. A method as defined in clause 1, in which the polyetheramine has a molecular weight of up to 2,000.

3. A method as defined in clause 2, in which the polyetheramine has a molecular weight of up to 1,000.

4. A method as defined in clause 3, in which the polyetheramine has a molecular weight in the range of from 150 to 1,000.

5. A method as defined in any one of the preceding clauses, in which the polyetheramine is water soluble, especially water miscible.

6. A method as defined in any one of the preceding clauses, in which the polyetheramine contains two or more ethylene oxide and/or propylene oxide monomer units and at least one primary or secondary amine unit —NHX where X is a hydrogen atom or a $C_{1-4}$ alkyl group.

7. A method as defined in any one of the preceding clauses, in which the polyetheramine is a mono- or di-amine having the schematic formula:

Y—PAO—Y' (I)

or a mono-, di- or tri-amine having the schematic formula:

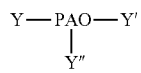 (II)

in which each of Y, Y' and Y" independently represents an end group at least one of which includes a primary or secondary amine group, and PAO represents a polyalkyleneoxide chain consisting of at least two ethylene oxide and/or propylene oxide monomer units.

8. A method as defined in clause 7, in which the polyetheramine has the schematic formula:

Y—(O—CH$_2$—CH(CH$_3$))$_a$—(O—CH$_2$—CH$_2$)$_b$—Y' (III)

in which a represents the number of propylene oxide monomer units present and b represents the number of ethylene oxide monomer units present; or the general formula:

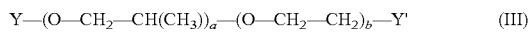 (IV)

in which R represents a hydrogen atom or a methyl group, R' represents a hydrogen atom, a methyl or an ethyl group, d is 0 or 1, and c, e and f are the number of propylene oxide and/or ethylene oxide monomer units present.

9. A method as defined in any one of the previous clauses, in which the polyetheramine has one of the formulae:

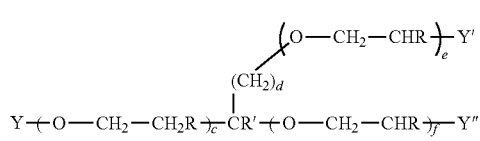 (V)

in which R is H or CH$_3$, and x and y are the numbers of propylene oxide and/or ethylene oxide monomer units in the polyether chain;

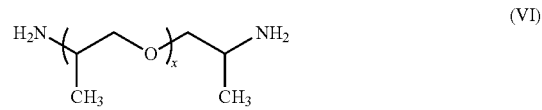 (VI)

in which x is the number of propylene oxide monomer units in the polyether chain;

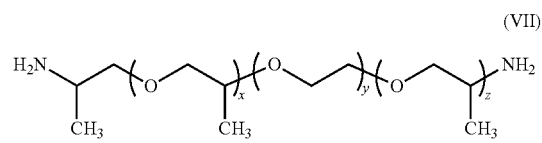 (VII)

in which x and z are the number of propylene oxide monomer units in two blocks in the polymer chain, and y is the number of EO monomer units in the polyether chain;

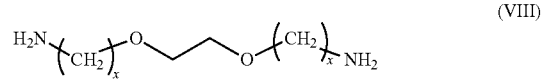 (VIII)

in which x is 2 or 3;

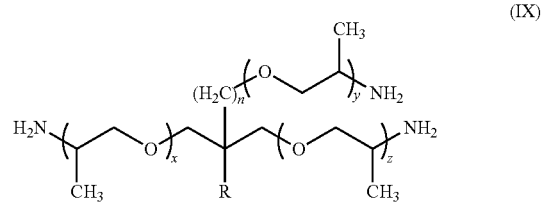 (IX)

in which x, y and z together represent the total number of propylene oxide monomer units present in the branched chain polymer, n is 0 or 1, and R is hydrogen, methyl or ethyl; or a compound of one of the formulae (V) to (IX) above in which one or more of the NH$_2$ end groups has been converted into a secondary amine group.

10. A method as defined in clause 9, in which the polyetheramine has the formula (IX), in which the number of moles of polyethylene oxide is between 5 and 6; or in which the polyetheramine has the formula (VI), in which x in the formula (VI) is on average from 6 to 7.

11. A method as defined in any one of the preceding clauses, in which the membrane-forming polymer is selected from cellulose acetate/triacetate; polyamide; polypiperazine; polybenzimidazoline; polysulfone; polyol; polyacrylonitrile; polyethersulfone; polysulfone; poly(phthalazinone ether sulfone ketone; poly(vinyl butyral); polyvinylidene fluoride; poly(tetrafluoroethylene); polypropylene; polyethylene; and polyetheretherketone.

12. A method as defined in any one of the preceding clauses, in which the membrane-forming polymer is selected from polysulfone, polyethersulfone, polyvinylidene fluoride, polyacrylonitrile, or polyethylene.

13. A method as defined in any one of the preceding clauses, in which the solvent used in step (a) is or includes DMF, NMP, dimethylacetamide, acetone, DMSO, or THF.

14. A method as defined in any one of the preceding clauses, in which the mixture prepared in step (a) also includes a non-solvent.

15. A method as defined in clause 14, in which the non-solvent is water or an alcohol.

16. A method as defined in any one of the preceding clauses, in which the mixture prepared in step (a) also includes one or more known pore forming additives.

17. A method as defined in any one of the preceding clauses, in which step (b) involves immersing the mixture produced in step (a) in a medium in which the polymer is insoluble.

18. A method as defined in any one of the preceding clauses, in which the membrane obtained in step (b) is subsequently provided with a coating.

19. A membrane preparable by a process as defined in any one of the preceding clauses.

20. A membrane as defined in clause 19, which is a nanofiltration membrane or a reverse osmosis membrane.

BRIEF DESCRIPTION OF THE DRAWINGS

FIG. 1 shows a comparison of flux rates and molecular weight cut-offs of commercially available membranes compared with the membranes of examples 1 to 5.

FIG. 2 shows a comparison of flux rates and molecular weight cut-offs of the membrane of example 1 and comparative examples 6 and 7.

FIG. 3 shows the effect of different quantities of polyetheramines added in the membranes of examples 1, 8 and 9.

FIG. 4 shows the flux decline of a comparative GE Osmonice UF membrane in a BSA test.

FIG. 5 shows the flux decline of the membrane of example 1 in a BSA test.

FIG. 6 shows BSA rejection for the membrane of example 1.

FIG. 7 shows SEM micrographs of the membrane of example 1, surface on the left and cross-section on the right.

FIG. 8 shows SEM micrographs of the membrane of example 2, surface on the left and cross-section on the right.

FIG. 9 shows SEM micrographs of the membrane of example 3, surface on the left and cross-section on the right.

FIG. 10 shows SEM micrographs of the membrane of example 4, surface on the left and cross-section on the right.

FIG. 11 shows SEM micrographs of the membrane of example 5, surface on the left and cross-section on the right.

FIG. 12 shows SEM micrographs of the commercially-available membrane Millipore Biomax 30 kDa, pore size 10-20 nm, surface on the left and cross-section on the right.

FIG. 13 shows SEM micrographs of the commercially-available membrane Sterlitech PVDF, surface on the left and cross-section on the right.

FIG. 14 shows an SEM of the surface of Sterlitech PES00325100 0.03 micron membrane.

FIG. 15 shows an SEM of the surface of the membrane of example 8.

FIG. 16 shows an SEM of the surface of the membrane of example 9.

FIGS. 18 to 24 show SEM micrographs of the membranes of examples 15 to 21, respectively, surface on the left and cross-section on the right.

FIGS. 25 and 26 show SEM micrographs of the comparative membranes of example 22, made using PEO and acrylamide, respectively, as additives, surface on the left and cross-section on the right.

The following Examples illustrate the invention.

In the Examples, various polyetheramines were used. In each case, their water solubility was measured using DLS and the following protocol. Malvern ZetaSizer Nano-S light scattering (DLS) equipment was used to observe formation of particles at a given concentration of polyetheramine in water. Combination of count rate and attenuator monitoring was used to determine the increase in number of particles as the concentration of polyetheramine increased to determine solubility. Polystyrene latex was used as the reference material (RI: 1.590; absorption: 0.010 at 633 nm), and water as the dispersant (viscosity: 0.9781 cP; RI: 1.330). The measurements were carried out in Science Brand disposable microcuvettes with a sample volume of 100 µL, at 21° C. Each sample was measured 5 times, each measurement was the average of 11 runs. Where the polyetheramine and water are not completely miscible, DLS measurements were continued up to the point where visible phase separation was observed.

Example 1. PS

Membrane (20-30 nm Pore Size)

Figure 17:
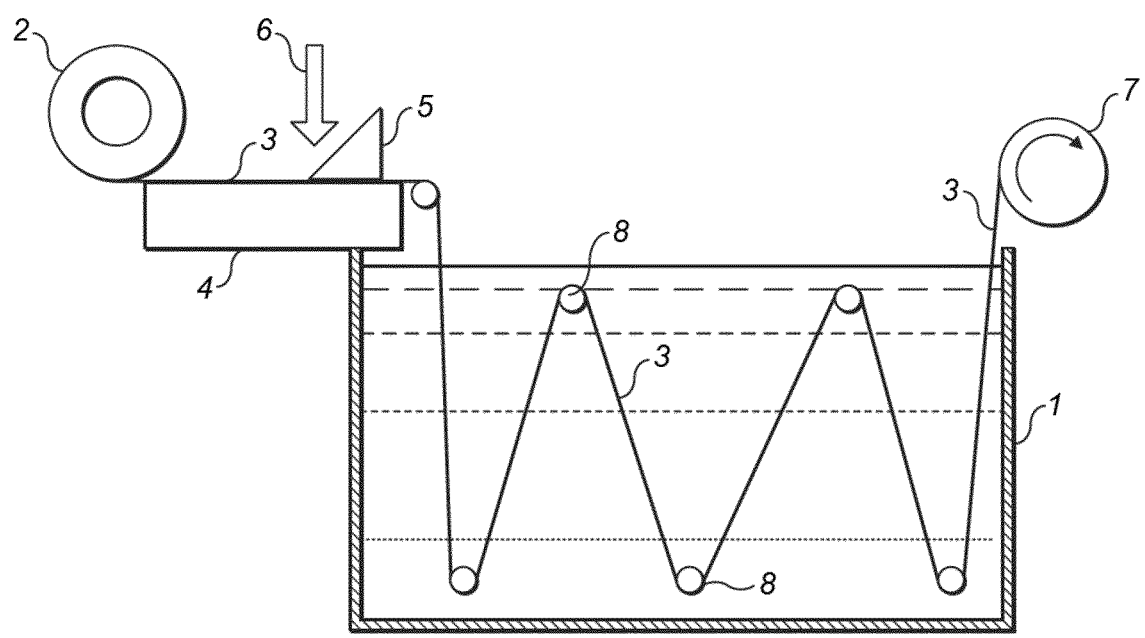
FIG. 17 shows a schematic representation of the custom-built pilot casting line used to make the membranes described in the Examples.

Membrane in Example 1 was prepared as follows: 567 g of polysulfone (BASF ULTRASON® S6010), 265 g of 2-Methoxyethanol (Sigma-Aldrich 284467) and 63 g of polyetheramine (Huntsman JT403, MW 440, miscible in water) was dissolved in 2422 g of N,N-dimethylformamide (Sigma-Aldrich D158550) at 70 deg C. under mechanical stirring for 8 h. Upon cooling to room temperature the dope was degassed and cast on a nonwoven polyester backing fabric (Hirose 05TH100) using doctor blade (gap 0.25 micron) at 30 fpm (feet per minute). The membrane was formed in a quench tank, where the dissolved polymer dope is immersed in water (a non-solvent). The casting process was performed using a pilot casting line custom built by Cut Membranes Canada, a schematic representation of which is shown in FIG. 17. In FIG. 17, 1 is the quench tank containing water; 2 is a roll of backing fabric 3 which passes over a granite stone support 4. Dope is added at 6, using doctor blade 5. Additional rollers 8 carry the dope on the fabric through the quench tank, and the finished membrane is taken up by roller 7 powered by an electric motor.

Example 2. PS

Membrane (12 nm Pore Size)

Membrane in Example 2 was prepared as follows: 696.78 g of polysulfone (BASF ULTRASON® S6010), 265 g of 2-Methoxyethanol (Sigma-Aldrich 284467) and 63 g of polyetheramine (Huntsman JT403) were dissolved in 2292 g of N,N-dimethylformamide (Sigma-Aldrich D158550) at 70 deg C. under mechanical stirring for 8 h. Upon cooling to room temperature the dope was degassed and cast on a nonwoven polyester backing fabric (Hirose 05TH100) using doctor blade (gap 0.25 micron) at 30 fpm. The membrane was formed in the quench tank, where the dissolved polymer dope is immersed in water. The casting process was performed using the pilot casting line mentioned above.

Example 3. PES

Membrane (20-30 nm Pore Size)

Membrane in Example 3 was prepared using as follows: 630 g of polyethersulfone (BASF ULTRASON® S6020p), 331 g of isopropanol (Sigma-Aldrich 278475) and 33.18 g of polyetheramine (Huntsman JD400, MW 430, miscible in water) were dissolved in 2321 g of N,N-dimethylformamide (Sigma-Aldrich D158550) at 70 deg C. under mechanical stirring for 8 h. Upon cooling to room temperature the dope was degassed and cast on a nonwoven polyester backing fabric (Hirose 05TH100) using doctor blade (gap 0.25 micron) at 30 fpm. The membrane was formed in the quench tank, where the dissolved polymer dope is immersed in water. The casting process was performed using the pilot casting line mentioned above.

Example 4. PVDF

Membrane (50-100 nm Pore Size)

Membrane in Example 4 was prepared as follows: 464 g of polyvinylidene fluoride (Solvay Solef® 1015/1001), 18.2 g of formic acid (Sigma-Aldrich F0507), used to prevent the PVDF from being cross-linked in basic conditions, and 54 g of polyetheramine (Huntsman JT403) were dissolved in 2778 g of N,N-dimethylformamide (Sigma-Aldrich D158550) at 70 deg C. under mechanical stirring for 8 h. Upon cooling to room temperature the dope was degassed and cast on the nonwoven polyester backing fabric (Hirose 05TH100) using doctor blade (gap 0.25 micron) at 30 fpm. The membrane was formed in the quench tank, where the dissolved polymer dope is immersed in water. The casting process was performed using the pilot casting line mentioned above.

Example 5. PS

Membrane (20-40 nm Pore Size)

Membrane in Example 5 was prepared as follows: 567 g of polysulfone (BASF ULTRASON® S6010), 265 g of 2-Methoxyethanol (Sigma-Aldrich 284467) and 63.04 g of polyetheramine (Huntsman JM600, MW 600, miscible in water) were dissolved in 2420 g of N,N-dimethylformamide (Sigma-Aldrich D158550) at 70 deg C. under mechanical stirring for 8 h. Upon cooling to room temperature the dope is degassed and cast on a nonwoven polyester backing fabric (Hirose 05TH100) using doctor blade (gap 0.25 micron) at 30 fpm. The membrane was formed in the quench tank, where the dissolved polymer dope is immersed in water. The casting process was performed using the pilot casting line mentioned above.

Example 6 (Comparative). PS Polyethyleneimine 0.8 kDa

Membrane (20-50 nm Pore Size)

Membrane in Example 6 was prepared as follows: 630 g of polysulfone (BASF ULTRASON® S6010), 265 g of 2-Methoxyethanol (Sigma-Aldrich 284467) and 8.29 g of PEI 0.8 kDa (Sigma-Aldrich 408719) were dissolved in 2412 g of N,N-dimethylformamide (Sigma-Aldrich D158550) at 70 deg C. under mechanical stirring for 8 h. Upon cooling to room temperature the dope was degassed and cast on a nonwoven polyester backing fabric (Hirose 05TH100) using doctor blade (gap 0.25 micron) at 30 fpm. The membrane was formed in the quench tank, where the dissolved polymer dope is immersed in water. The casting process was performed using the pilot casting line mentioned above.

Example 7 (Comparative). PS Polyallylamine 65 kDa

Membrane

Membrane in Example 7 was prepared as follows: 630 g of polysulfone (BASF ULTRASON® S6010), 265 g of 2-Methoxyethanol (Sigma-Aldrich 284467) and 33.18 g of polyallylamine 65 kDa (Sigma-Aldrich 479144) were dissolved in 2387 g of N,N-dimethylformamide (Sigma-Aldrich D158550) at 70 deg C. under mechanical stirring for 8 h. Upon cooling to room temperature the dope was degassed and cast on the nonwoven polyester backing fabric (Hirose 05TH100) using doctor blade (gap 0.25 micron) at 30 fpm. The membrane was formed in the quench tank, where the dissolved polymer dope is immersed in water. The casting process was performed using the pilot casting line mentioned above.

Example 8 (20-30 nm Pore Size)

Membrane in example 8 was prepared using as follows: 567 g of polysulfone (BASF ULTRASON® S6010), 265 g of 2-Methoxyethanol (Sigma-Aldrich 284467) and 33.15 g of polyetheramine (Huntsman JT403) were dissolved in 2450 g of N,N-dimethylformamide (Sigma-Aldrich D158550) at 70 deg C. under mechanical stirring for 8 h. Upon cooling to room temperature the dope was degassed and cast on the nonwoven polyester backing fabric (Hirose 05TH100) using doctor blade (gap 0.30 micron) at 30 fpm. The membrane was formed in the quench tank, where the dissolved polymer dope is immersed in water. The casting process was performed using the pilot casting line mentioned above.

Example 9 (20-30 nm Pore Size)

Membrane in example 9 was prepared using as follows: 567 g of polysulfone (BASF ULTRASON® S6010), 265 g of 2-Methoxyethanol (Sigma-Aldrich 284467) and 16.6 g of polyetheramine (Huntsman JT403) were dissolved in 2467 g of N,N-dimethylformamide (Sigma-Aldrich D158550) at 70 deg C. under mechanical stirring for 8 h. Upon cooling to room temperature the dope was degassed and cast on the nonwoven polyester backing fabric (Hirose 05TH100) using doctor blade (gap 0.28 micron) at 30 fpm. The membrane was formed in the quench tank, where the dissolved polymer dope is immersed in water. The casting process was performed using the pilot casting line mentioned above.

Example 10 (20-30 nm Pore Size)

The method of Example 1 was followed exactly except that instead of the backing fabric supplied by Hirose, a nonwoven polyester backing fabric supplied by Awa (AWA #2) was used.

Examples 11 to 14: Characterization and Testing of Membranes

Example 11: Pure Water Flux and Molecular Weight Cut-Off

Pure water flux tests were carried out using Amicon (EMD Millipore, 5124 Stirred Cell Model 8400, 400 mL)

stirred cells. The membrane was fitted into the cell and the cell was filled with deionized water and pressurized with compressed air from 0-5 bar of pressure. Permeate was collected for 12 seconds and permeability GFD/PSI calculated based on known surface area and pressure.

Molecular weight cut off and rejection properties of the membranes were tested using dextran as a solute. Additionally rejection of Bovine Serum Albumin (BSA) and pepsin was used for rejection and fouling tests.

Molecular cut off testing was performed using a mixture of dextrans (America Polymer Standards Corporation) at varied molecular weight (1 kDa-10 000 kDa) in PB buffer pH 7.5. The test membrane was placed in an Amicon stirred cell (EMD Millipore, 5121, Model 8010, 10 mL). 5 ml of feed solution containing mixture of dextrans at a concentration of 0.5 g/liter was run through the membrane at 0.094 ml/min using a peristaltic pump (Cole-Palmer Masterflex L/S model no. 4551-10) with the first 0.5 ml discarded and subsequent 0.5 ml of permeate collected for chromatography and comparison with the feed. A low flow rate combined with stirring allows for measurement unaffected by concentration polarization. Permeate and feed were evaluated for the molecular weight distribution using HPLC Agilent Technologies 1260 Infinity using RID detector with three column set up (PL Aquagel-OH 1000-60,000; 20,000-200,000; and 200,000 to 10 million respectively). The distribution of the feed was compared to distribution of the permeate at a given elution volume, resulting in rejection following the formula:

$$R = RID(\text{feed}) - RID(\text{permeate})/RID(\text{feed})$$

Molecular cut-off for a particular membrane is defined as the molecular weight of the solute where 90% rejection in observed.

Figure 1:
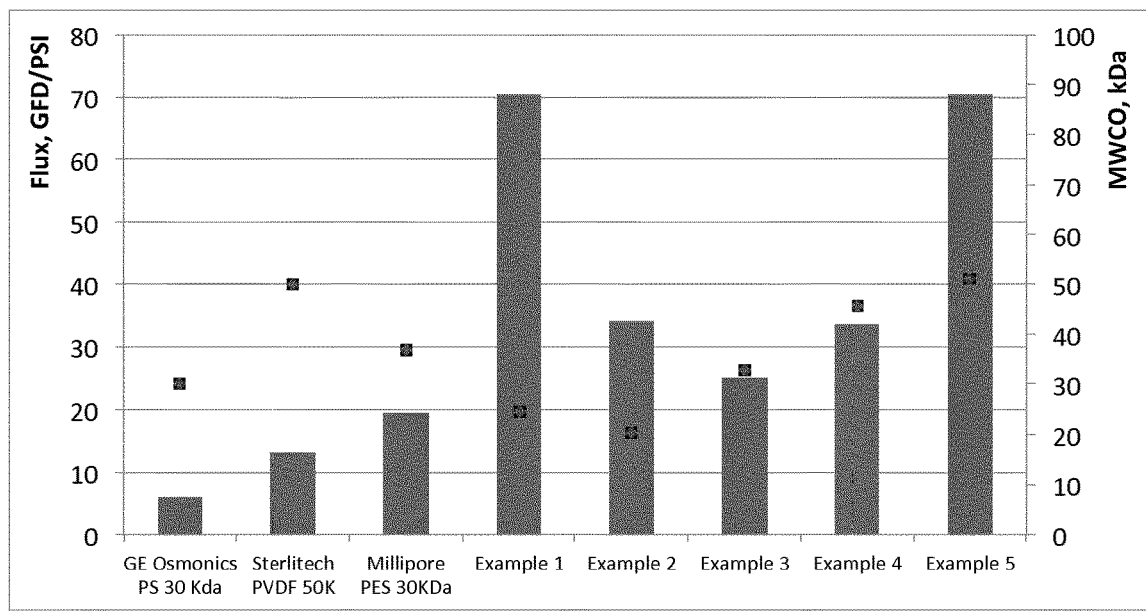
FIGS. 1 to 16 and 18 to 26 show the results of the testing described in the Examples.

FIG. 1 presents the membrane performance data comparison of various commercially available membranes, including the market leader Millipore BioMax 30 kD PES membrane, with the membranes where polyetheramines were added to the formulation of different membrane-forming polymers. It is clearly seen that molecular weight cut-offs can be easily manipulated using various polyetheramines and that the resulting membranes are characterized by improved permeability over competitor membranes at the corresponding molecular weight cut off. The commercially available ultrafiltration membranes are designed to be operated at much higher pressure (30 PSI+), while membranes according to the invention can operate successfully in the range from 1-100+ PSI.

Figure 2:
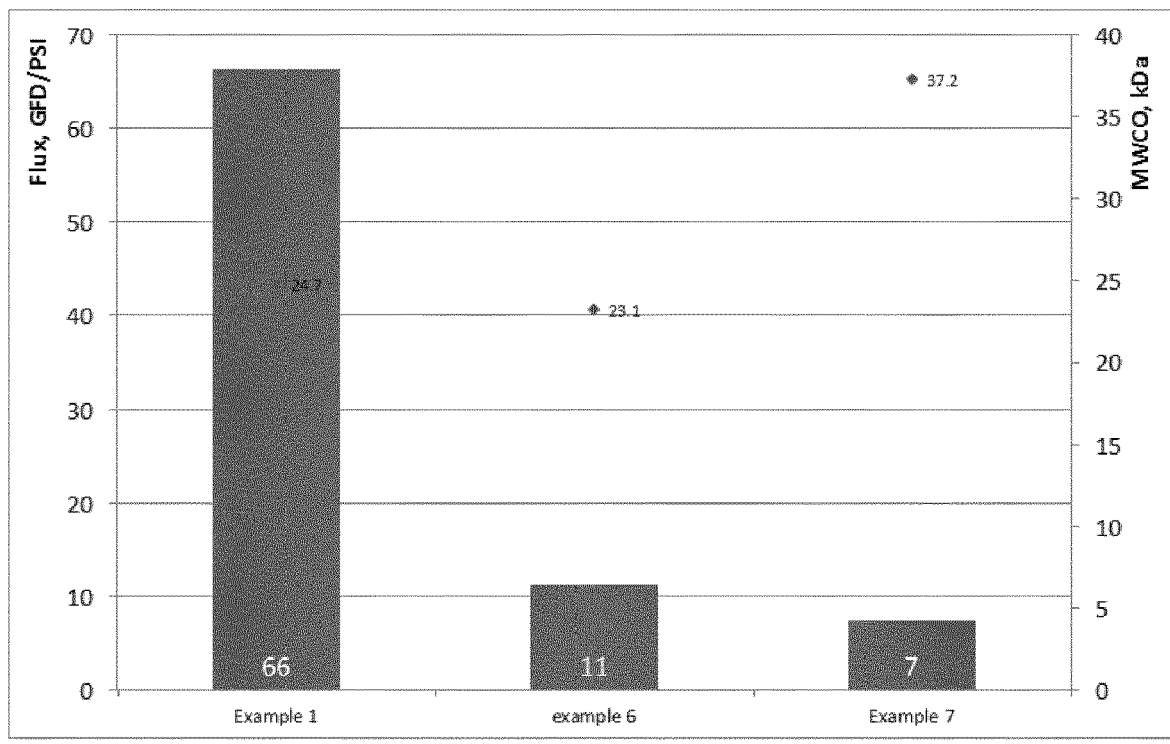

FIG. 2 presents the membrane performance data comparison of the membrane prepared according to example 1, where polyetheramine was used as a dope additive, with the membranes prepared using other poly-amine containing additives of comparative examples 6 and 7. It is clear that membranes where polyetheramines were used as a dope additive are characterized by improved permeability compared with membranes prepared using polyamine containing additives.

Figure 3:
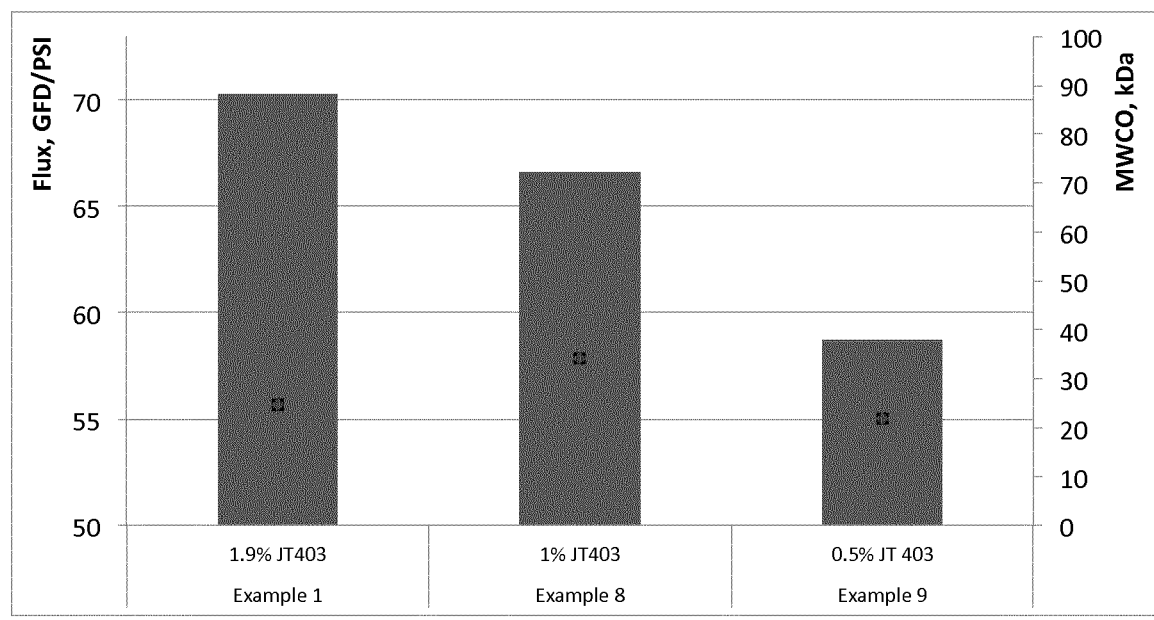

FIG. 3 shows the effect of the different amounts of polyetheramine added to the membranes prepared in examples 1, 8 and 9.

Example 12: BSA Rejection and Fouling Test

BSA (bovine serum albumin) rejection and fouling studies were performed using a GE Osmonics High Pressure RO Cell (Sterlitech 1230060) under tangential flow in recycling mode. The pressure of the system was adjusted to the permeability of the membrane in order to keep cross-flow at the steady value of 0.15 GPM with 4 liters of solution used in total.

Feed: 1 g/liter of BSA (Fitzgerald 30-AB70), 50 mM NaCl (Sigma-Aldrich S9888) in deionized water The membranes tested for rejection and fouling using BSA were tested in tangential flow configuration under specified pressure. Sampling of permeates and feed was simultaneous, at 30 minutes intervals, and rejection was measured using the Quick Start™ Bradford Protein Assay (BIORAD).

Flux was measured by collecting the permeate in standardized unit of time using known surface area to calculate GFD/PSI values. Comparative flux decline studies (fouling with BSA) of membranes prepared with the membrane of example 1 and GE Osmonics polysulfone 30 kDa (Sterlitech™) membrane were conducted. Flux decline was monitored over a fixed volume of permeated water (liter/$m^2$).

Figure 4:
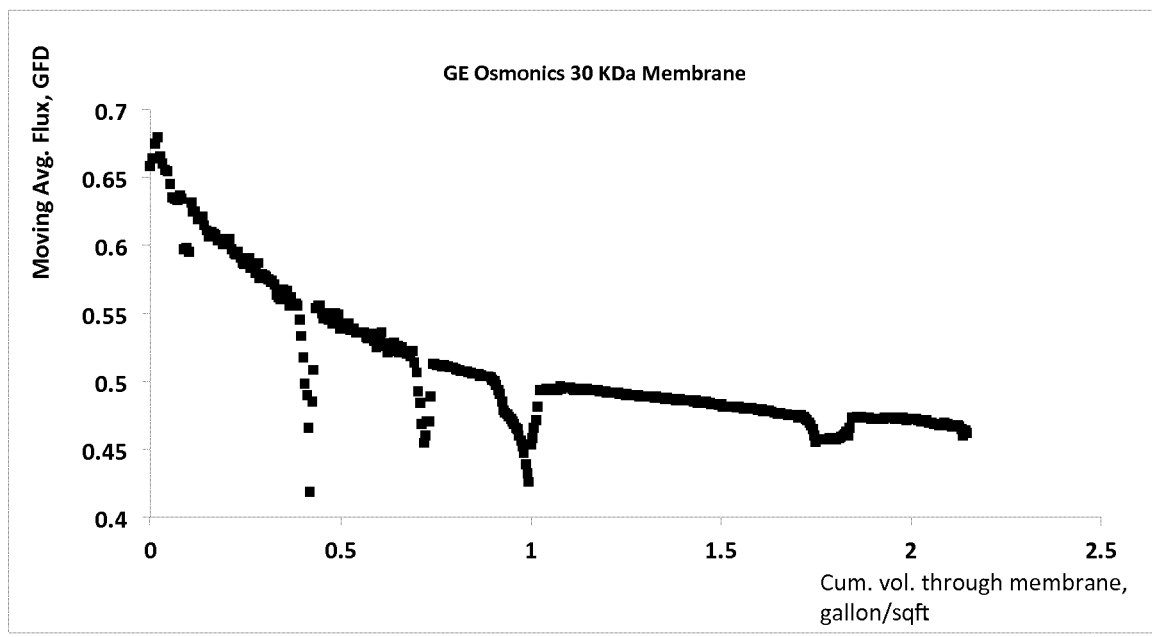
Figure 5:
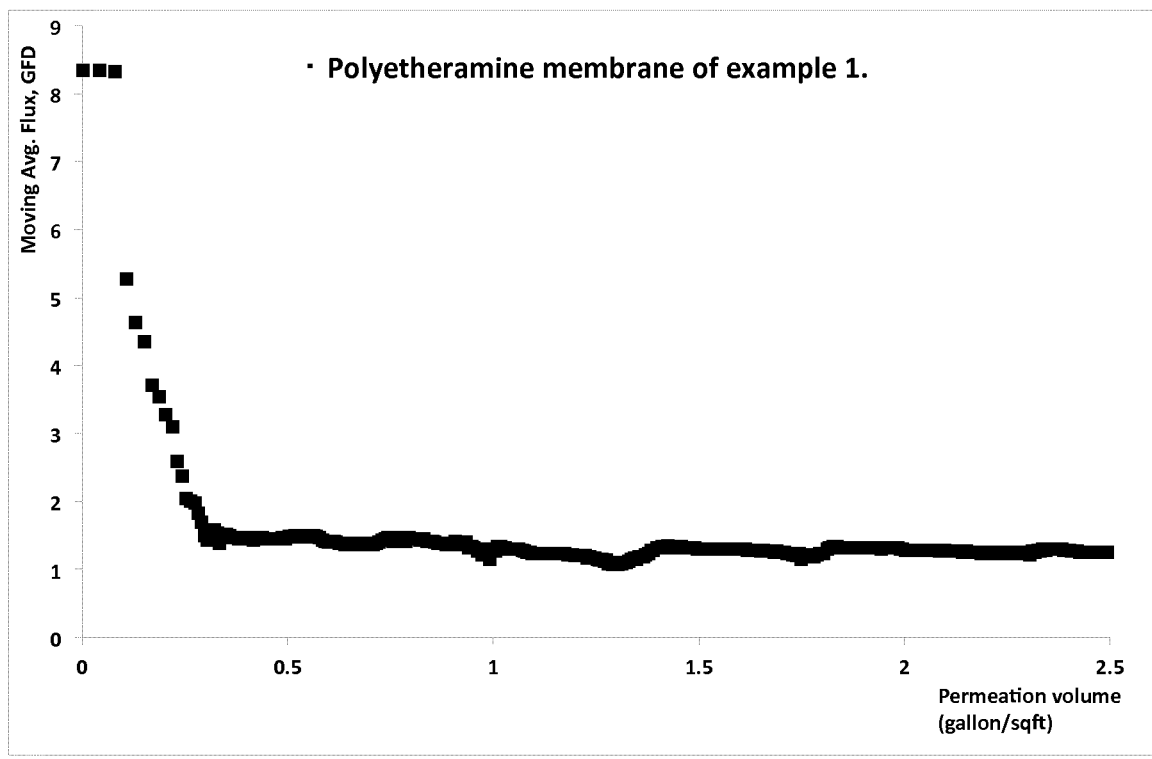

Test 1: GE Osmonics 30 KDa Membrane
  Initial flow at 32 psi=0.067 GFD
  Testing conditions=50 mM NaCl+1 g/L BSA feed solution, Operating Pressure=32 psi. Total volume of feed was 4 L and a recycle mode of feed fouling was applied to the system. The results are shown in FIG. 4.

Test 2: Polyetheramine Membrane of Example 1 25 kDa
  Initial flow at 4.5 psi=8.4 GFD
  Testing conditions: 50 mM NaCl+1g/L BSA feed solution, Operating Pressure=4.5 psi. Total volume of feed was 4 L and a recycle mode of feed fouling was applied to the system.

Figure 6:
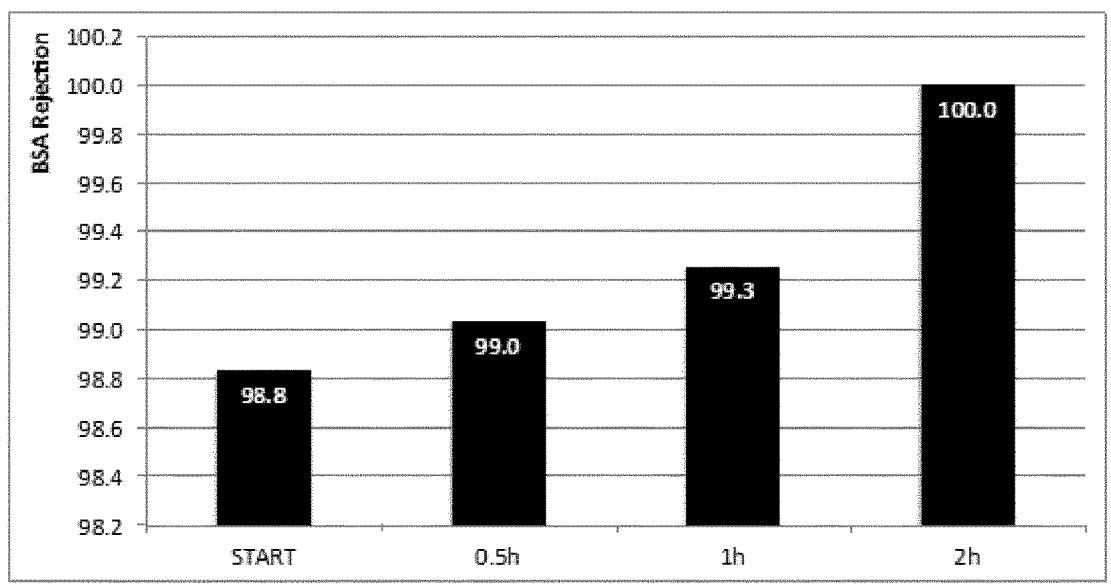
Figure 7:
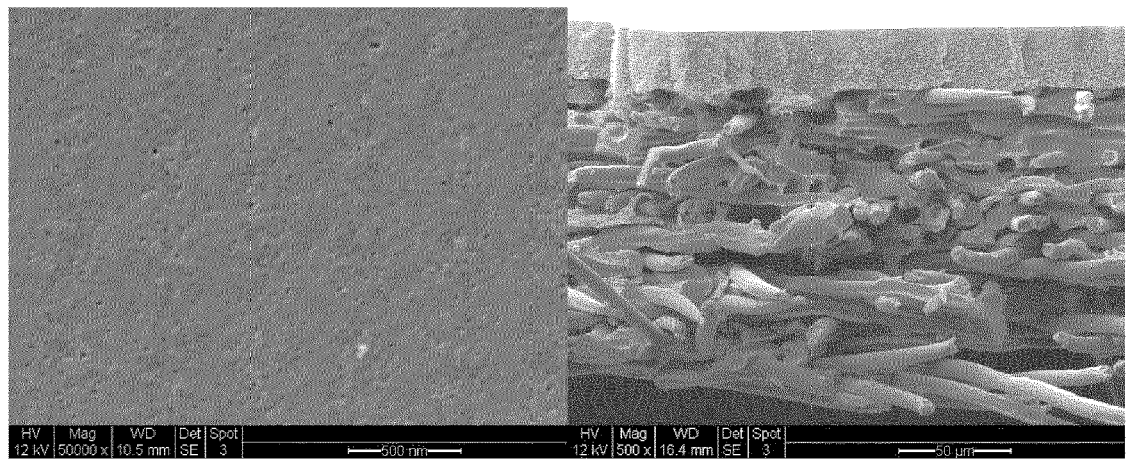
Figure 8:
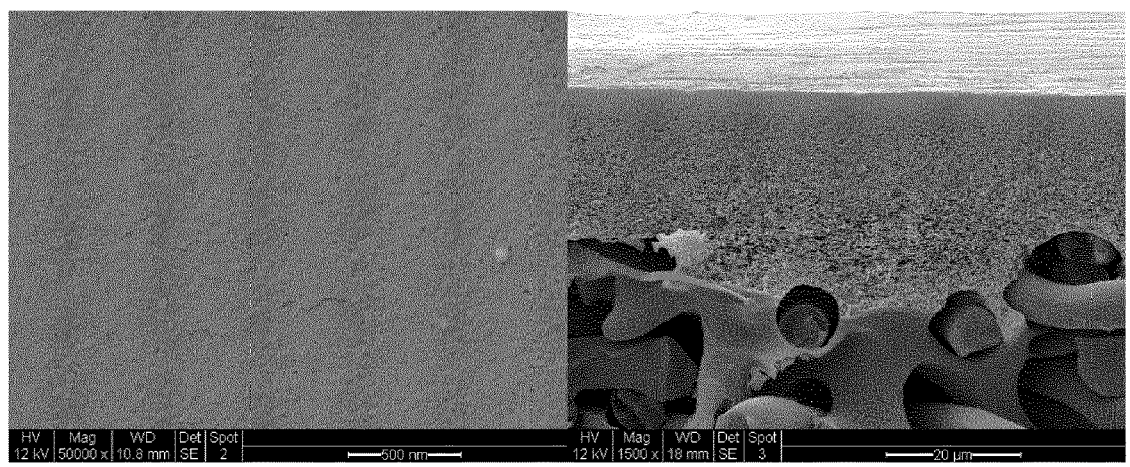

It is evident from the results shown that the pressure requirement for both membranes are different with 32 PSI needed to drive the permeation through GE Osmonics 30 kDa PS membrane and 4 PSI for the membrane from example 1 due to high permeability nature of this membrane. Both membranes were characterized by over 90% of BSA rejection with the membrane of example 1 showing 98+% BSA rejection. The results for the membrane of example 1 are shown in FIG. 6. The initial permeability of the membrane from example 1 was 89 times higher than of the GE Osmonics membrane, with both membranes showing flux decline over 100 liters/$m^2$. The membrane from example 1 showed a steady state flux value 3 times of the GE Osmonics membrane.

Example 13: SEM

Scanning electron microscopy was performed using an FEI XL30 environmental scanning electron microscope and SEM Pin Stubs (Ted Pella, Inc. 16111). Membrane samples were cut and mounted to the stubs using carbon tape (Ted Pella, Inc. 16085-1). Samples were coated with thin layer of gold to avoid charging in the SEM chamber. Gold was spattered for 30 seconds on VG/Polaron SC 7620. Surface and cross-section images were collected for each membrane sample.

Figure 12:
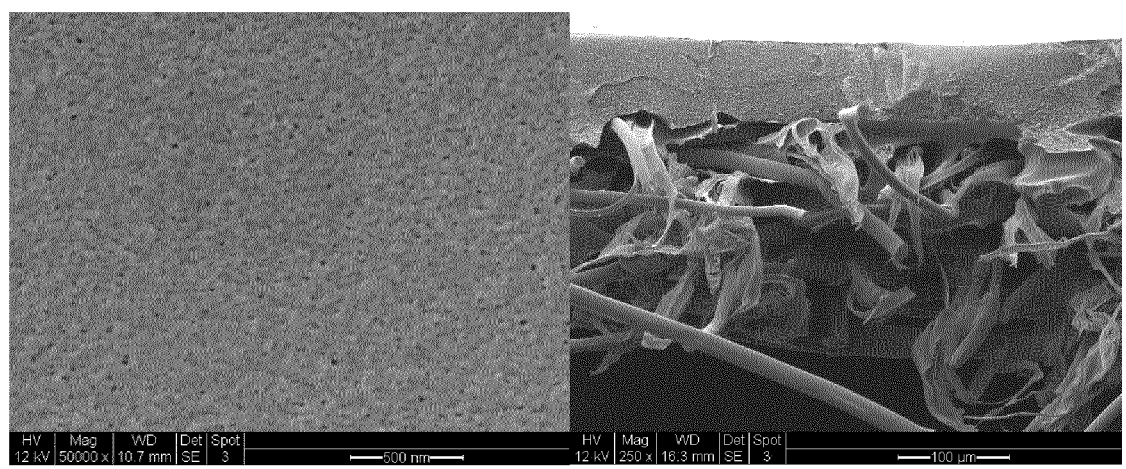

In the membranes studied the benefit of using polyetheramines is illustrated by performance numbers presented in Example 10 and 11 above, and visualized in micrographs showing surface porosity and the cross-section of the membranes. The membranes prepared according to examples 1-5 were further compared to commercial competitive products. SEM images of membranes prepared according to examples 1-5 are presented in FIGS. 7-11 respectively. Each of these figures shows the surface on the left, and the cross-section on the right. The images presented in FIGS. 7-11 show the pore size and pore size distribution improved or competitive, as compared to commercially available membranes shown in FIG. 12 for Millipore Biomax 30 kDa, pore size 10-20 nm, and FIG. 13 for Sterlitech PVDF membrane. Additional beneficial characteristics of ultrafiltration membranes prepared according to examples 1-5, namely lack of micro and macro voids, can be observed in the cross-sectional images in FIGS. 7-11. This is important for membrane stability at higher pressures, where compaction is usually observed. This is especially important when using membranes as a support material for coating of NF and RO membranes where higher pressures lead to significant compaction and reduction of flow.

Figure 10:
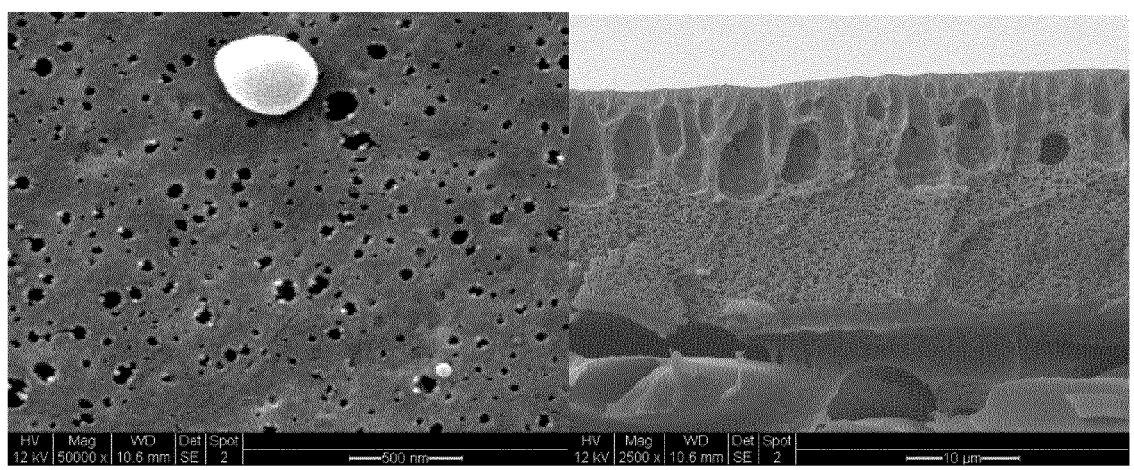
Figure 11:
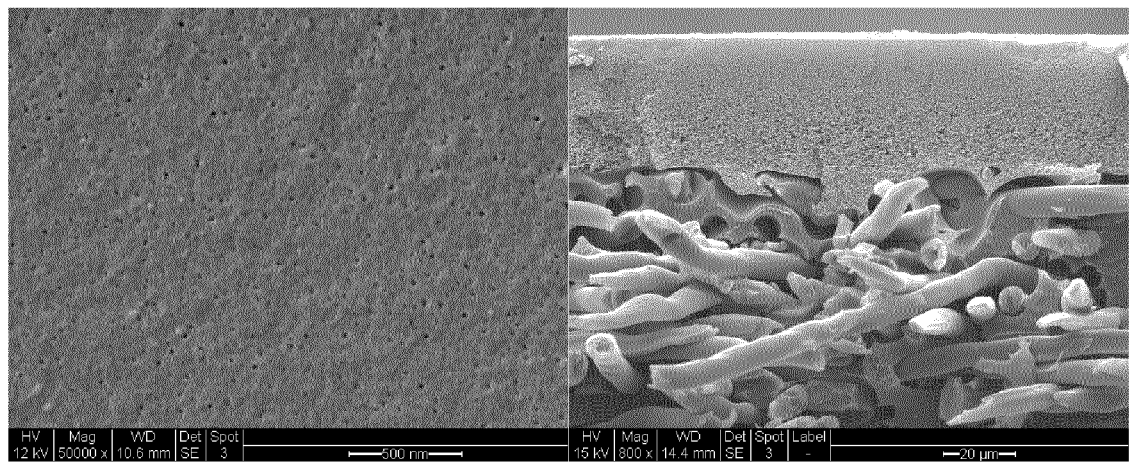
Figure 13:
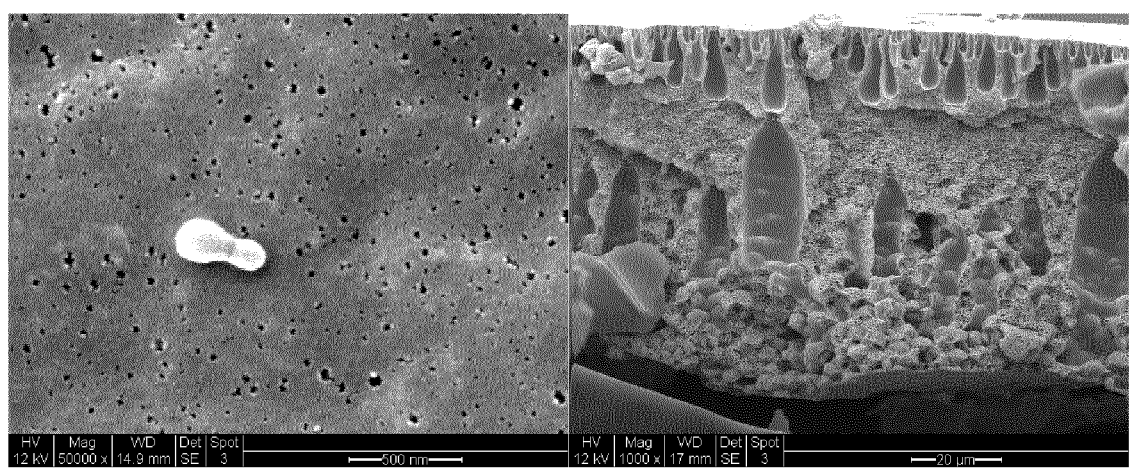

The beneficial impact of polyetheramine on the structure of the membrane is especially visible when comparing the cross-sectional images of PVDF based membrane of example 4 prepared with polyetheramine shown in FIG. 10 with the cross-section micrograph of PVDF membrane purchased from Sterlitech shown in FIG. 13.

Figure 9:
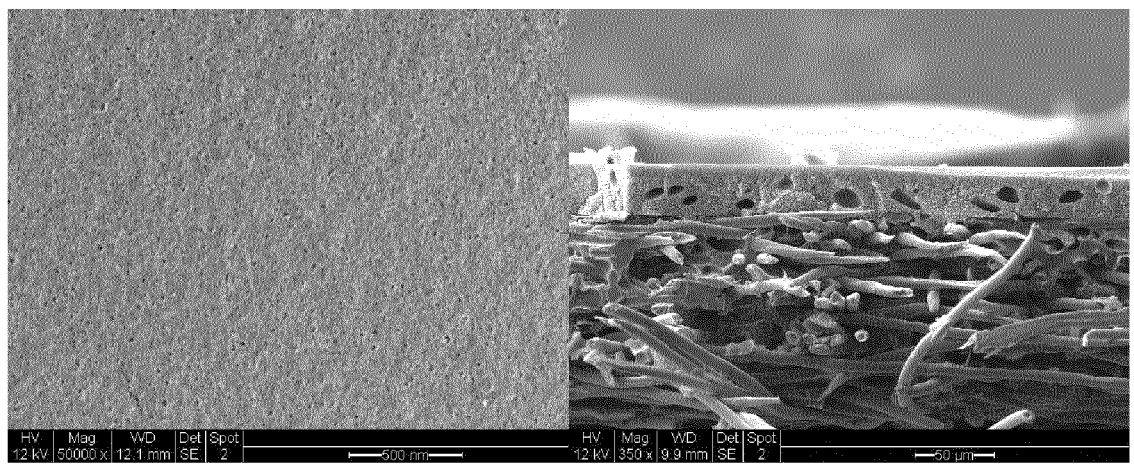
Figure 14:
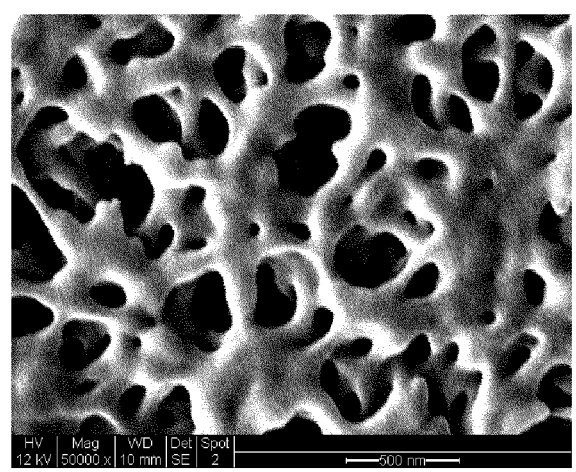
Figure 15:
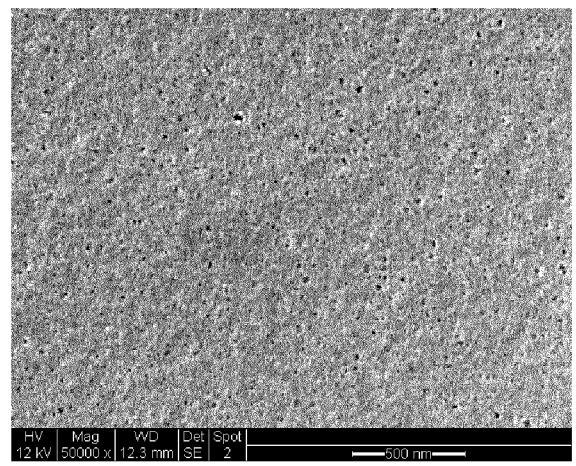
Figure 16:
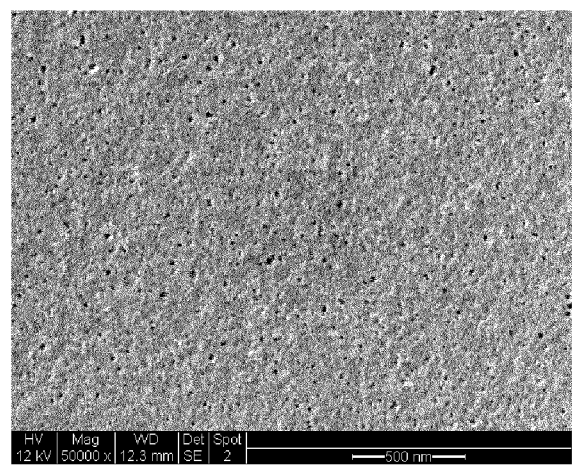

FIG. 14 shows the commercially available PES based 0.03 micron membrane from Sterlitech (PES00325100). This membrane is said to be characterized by 30 nm pore size, but this is not supported by the surface porosity shown in FIG. 14. FIGS. 9, 15 and 16 show, in comparison, the membranes of examples 3, 8 and 9, respectively, which clearly show superior surface characteristics.

Example 14: Bacterial Removal Study: Use of Membrane of Examples 1 and 10 to Remove *E. coli* BL21 (DE3)

*E. coli* suspension was prepared as follows. 500 ml of LB broth (5 g Tryptone, 2.5 g NaCl & 2.5 g yeast in 500 ml of Nano pure water) was prepared. The sample was dispensed into two 1 L culture flasks (250 ml in each flask) and autoclaved. The culture flasks were left to cool down until starting the overnight culture. The overnight culture was prepared by addition of 250 ul of sterilized kanamycin and 10 ul of the Canadian culture seed into each flask using aseptic techniques. The culture was grown at 37° C., 225 rpm for 16 hrs. The $OD_{600}$ was measured as 2.14. The overnight culture was dispensed into sterilized centrifuge bottle and centrifuged at 5000 rpm for 10 min. The supernatant was poured out. The left-over cell pellet was dispensed in the sterilized PBS using the original volume of culture and centrifuged at 5000 rpm for another 10 min. After disposing of the supernatant the cell pellet was dispensed into PBS. The cells were shaken to get even distribution of cells and PBS was used to bring up the volume to 500 ml. The $OD_{600}$ at this point was measured as 2.257. This suspension in PBS buffer was used as feed, $OD_{600}$=2.14, the estimated number of cells is about $10^9$ CFU/ml.

Membrane Testing Procedure:
1. 76 mm membrane of example 1 was stamped and assembled in the Amicon cell (model 8400); the pure water flux of the membrane of example 1 was tested at 5 psi
2. 50 ml of PBS buffer was rinsed through the membrane of example 1 under 5 psi, flow data is measured for 30 s. PBS was collected for optical density (OD) measurement and as cell counting negative control
3. 200 ml of *E-coli* was used as feed. The test was performed at 5 psi with 300 rpm stirring, recorded the flow data at the starting point and then collected 1-2 ml of permeate for plating in order to determine the bacterial removal percentage. Agar plates were prepared according to manufacturer instructions. Samples for OD measurement were collected at different time.
4. Performed the test until the *E-coli* feed ran out, washed the membrane thoroughly with deionised water, and then retested the pure water flux at 5 psi to compare it with the flux before testing.

The following results were obtained:
Feed: CFU/ml=$21 \times 10^7/0.2$ ml=$1.05 \times 10^9$
Permeate: CFU/ml=$20.5/0.2$ ml=$1.025 \times 10^2$
This corresponds to a bacterial rejection % of $1-1.025 \times 10^2/10.05 \times 10^9$, or 0.9999999.

The same procedure was carried out using the membrane of Example 10. In this case, absolute bacterial rejection was obtained.

Examples 15-21: Comparison of Different Polyetheramines

The process of Example 1 was repeated using each of the following polyetheramines manufactured by Huntsman. For each experiment, scanning electron microscopy of the resulting membrane was performed as described in Example 13, and the resulting micrographs (surface of the membrane on the left and cross-section on the right) are shown in FIGS. 18 to 22.

Example 15

Figure 18:
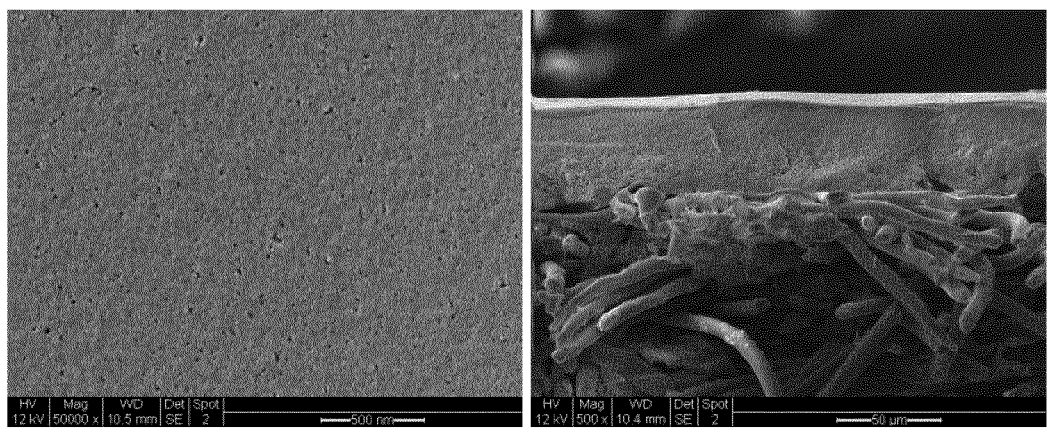

Jeffamine™ M1000, MW 1,000, miscible in water (FIG. 18)

Example 16

Figure 19:
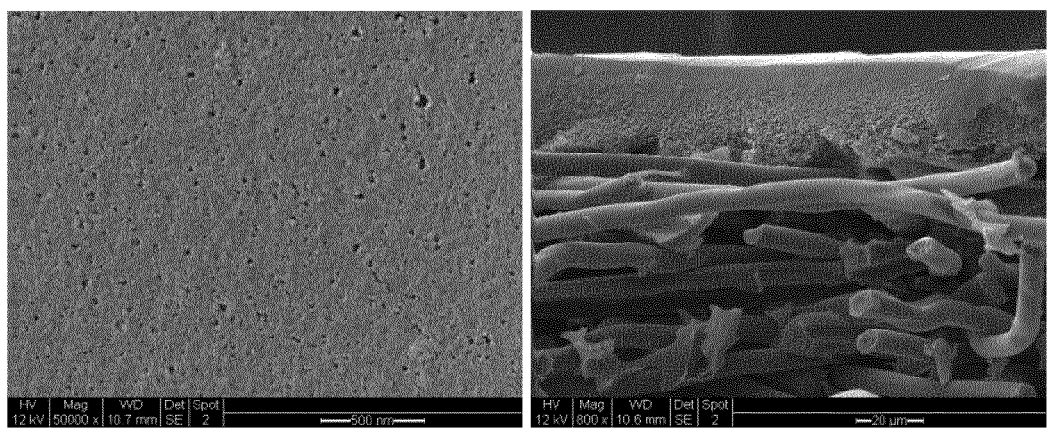

Jeffamine™ D400, MW 430, miscible in water (FIG. 19)

Example 17

Figure 20:
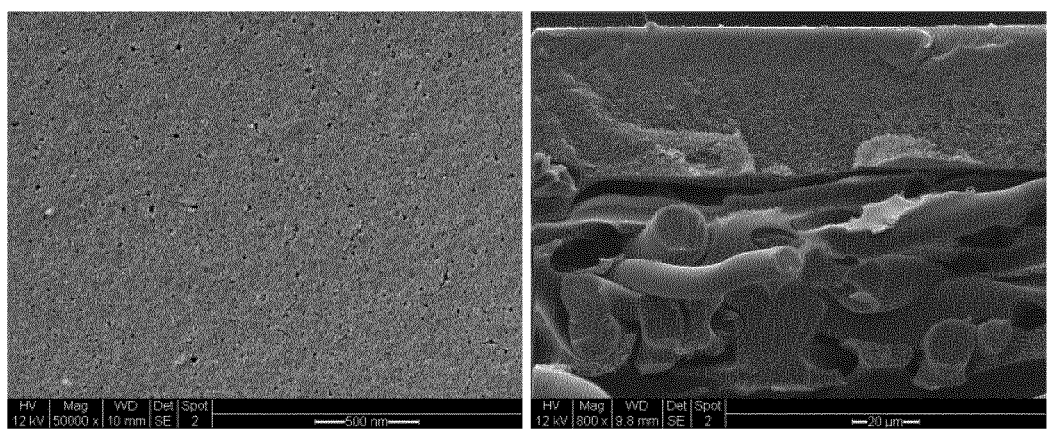

Jeffamine™ ED600, MW 600, miscible in water (FIG. 20)

Example 18

Figure 21:
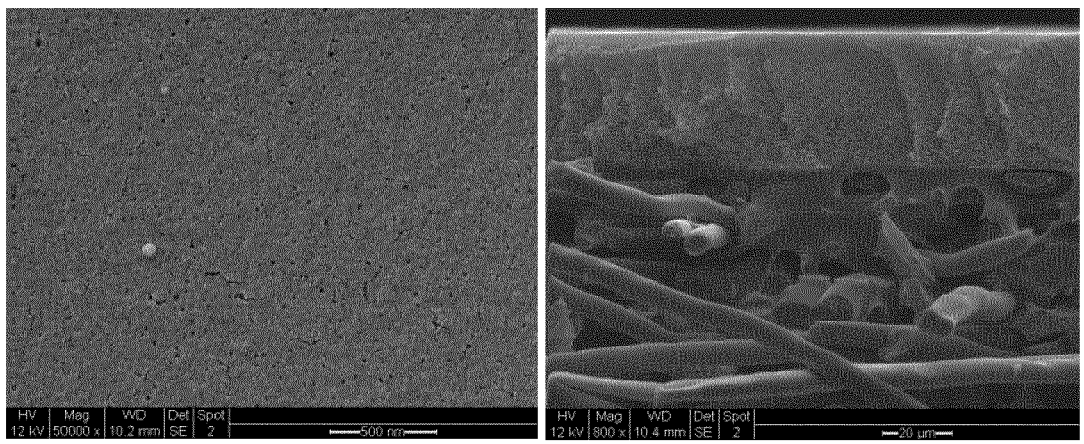

Jeffamine™ ED2003, MW 2,000, miscible in water (FIG. 21)

Example 19 (Comparative)

Figure 22:
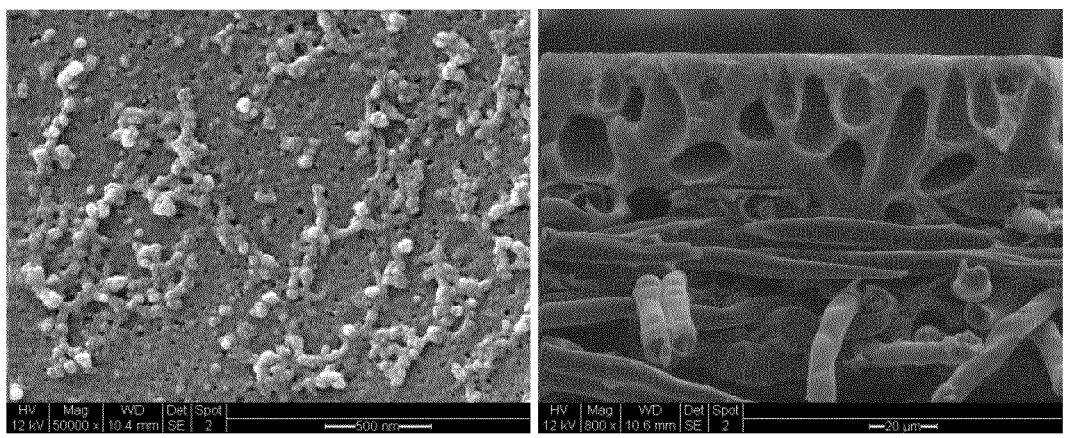

Jeffamine™ T3000, MW 3,000, solubility in water 0.050% w/v (FIG. 22)

Example 20 (Comparative)

Figure 23:
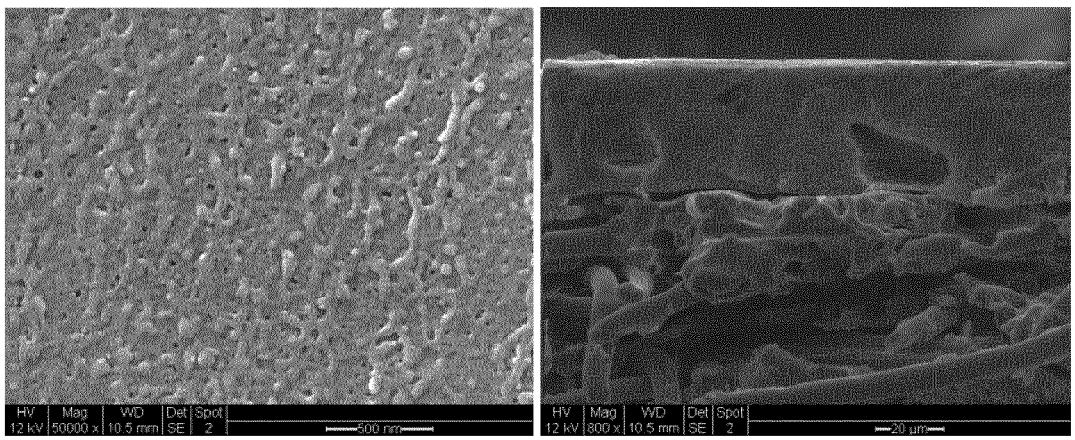

Jeffamine™ D4000, MW 4,000, solubility in water 0.0025% w/v (FIG. 23)

Example 21 (Comparative)

Figure 24:
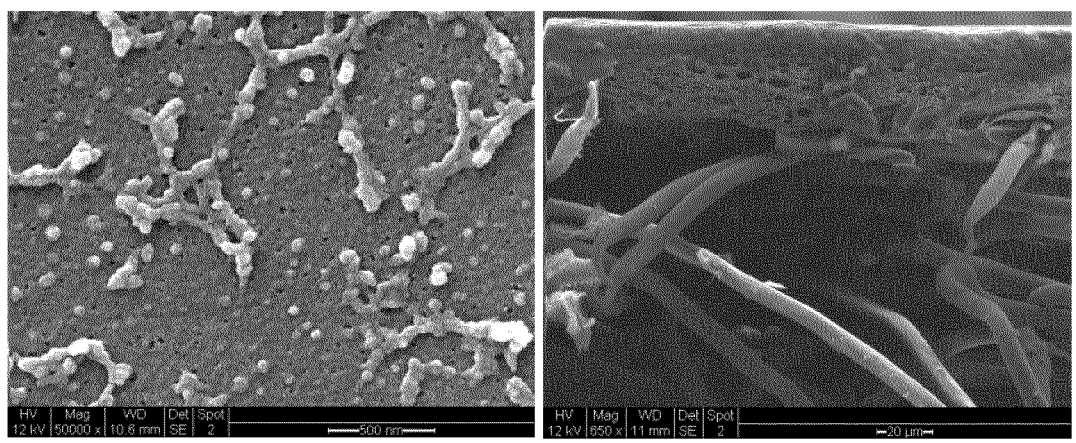

Jeffamine™ T5000, MW 5,000, solubility in water 0.040% w/v (FIG. 24).

The results clearly show that when using the specific polyetheramines according to the invention as additives during the casting process, a high-quality surface with uniform pore size and pore size distribution is obtained, together with a lack of micro and macro voids. In contrast, use of alternative polyetheramines not according to the invention leads to a visibly inferior membrane.

Example 22 (Comparative)

Figure 25:
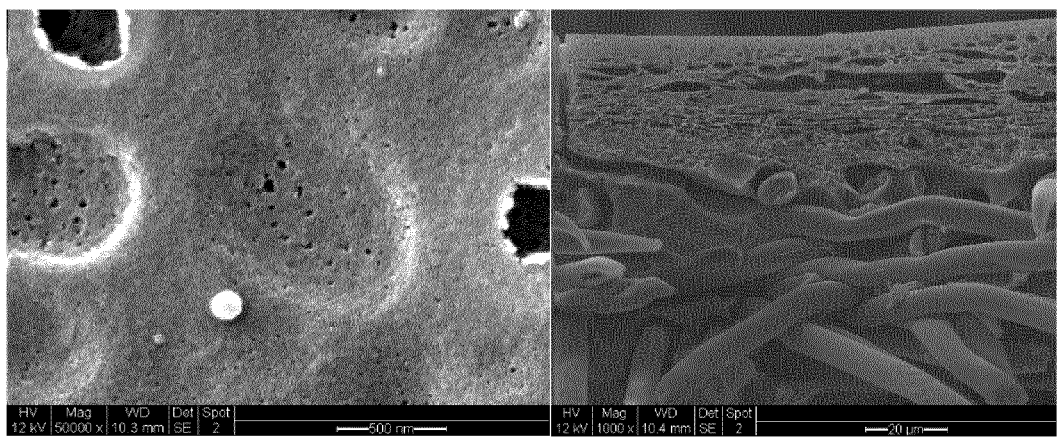
Figure 26:
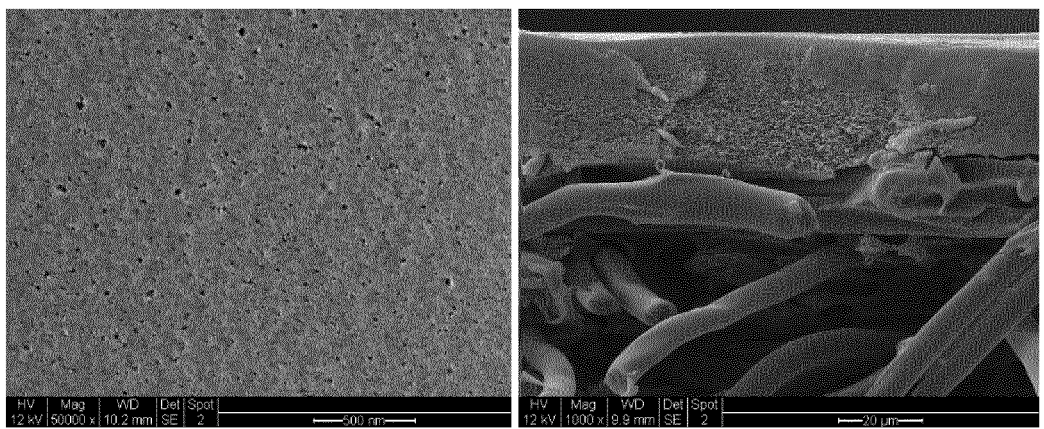

The process of Example 1 was repeated save that the polyetheramine additive was replaced by the same quantity of a different additive. The additives used were of the type listed in WO 2011/069050: a polyalkylene oxide, an acrylamide and a catecholamine. In all cases, it was found that the dope solution either phase separated or micro-phase separated, leading to unstable dope solutions resulting in either membrane not forming or formed membranes characterized by defects. In the case of polyalkylene oxide (PEO 100,000, Sigma-Aldrich 181986) the dope solution was very cloudy and micro-phase separated, and the resulting membrane was patchy and defective as shown in FIG. 25. In flux tests the membrane was characterized by unmeasurable molecular cut-off (within the range of the experimental design) and low pure water flow characteristics. In the case of membranes where acrylamide (Sigma-Aldrich A3553) was used as an additive, the formed membrane was characterized by increased pore size and hence a higher molecular cut-off, and lower pure water flux characteristics, as compared to the membrane of example 1. FIG. 26 shows SEMs of the surface and cross-section of the membrane. In the case of catecholamine (dopamine hydrochloride, Sigma-Aldrich H8502) as an additive, the dope was found to phase separate during the degassing stage making it impossible to cast a useful membrane.

The invention claimed is:

1. A method of preparing a membrane comprising the steps of:
    a) mixing together a membrane-forming polymer, a water-soluble polyetheramine, which is a polyether with at least one primary or secondary amine group attached to the polyether backbone and having a water solubility of at least 0.1% w/v at 21° C., and a solvent, said mixture containing no component which will react chemically with the polyetheramine; and
    b) casting said mixture to form the polymer into a solid membrane.

2. A method as claimed in claim 1, in which the water solubility of the polyetheramine is at least 0.2% w/v at 21° C.

3. A method as claimed in claim 2, in which the polyetheramine is miscible with water at 21° C.

4. A method as claimed in claim 1, in which the polyetheramine has a molecular weight of up to 2,500.

5. A method as claimed in claim 4, in which the polyetheramine has a molecular weight of up to 1,000.

6. A method as claimed in claim 5, in which the polyetheramine has a molecular weight in the range of from 150 to 1,000.

7. A method as claimed in claim 1, in which the polyetheramine contains two or more ethylene oxide and/or propylene oxide monomer units and at least one primary or secondary amine unit —NHX where X is a hydrogen atom or a $C_{1-4}$alkyl group.

8. A method as claimed in claim 1, in which the polyetheramine is a mono- or di-amine having the schematic formula:

Y-PAO-Y'  (I)

or a mono-, di- or tri-amine having the schematic formula:

(II)

in which each of Y, Y' and Y" independently represents an end group at least one of which includes a primary or secondary amine group, and PAO represents a polyalkyleneoxide chain consisting of at least two ethylene oxide and/or propylene oxide monomer units.

9. A method as claimed in claim 8, in which the polyetheramine has the schematic formula:

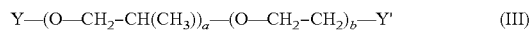

in which a represents the number of propylene oxide monomer units present and b represents the number of ethylene oxide monomer units present; or the general formula:

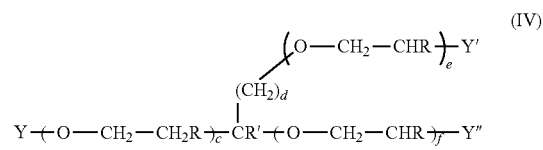

in which R represents a hydrogen atom or a methyl group, R' represents a hydrogen atom, a methyl or an ethyl group, d is 0 or 1, and c, e and f are the number of propylene oxide and/or ethylene oxide monomer units present.

10. A method as claimed in claim 1, in which the polyetheramine has one of the formulae:

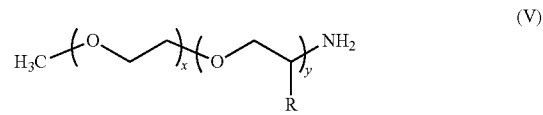

in which R is H or $CH_3$, and x and y are the numbers of propylene oxide and/or ethylene oxide monomer units in the polyether chain;

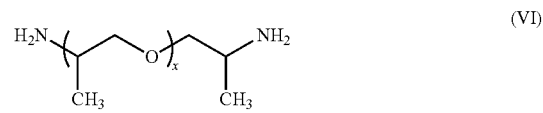

in which x is the number of propylene oxide monomer units in the polyether chain;

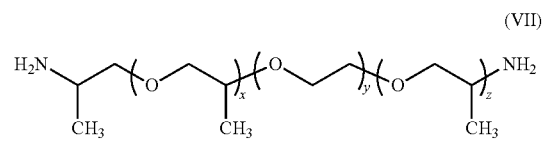

in which x and z are the number of propylene oxide monomer units in two blocks in the polymer chain, and y is the number of EO monomer units in the polyether chain;

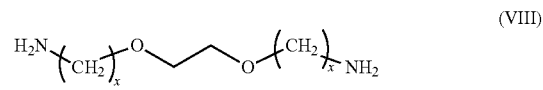

in which x is 2 or 3;

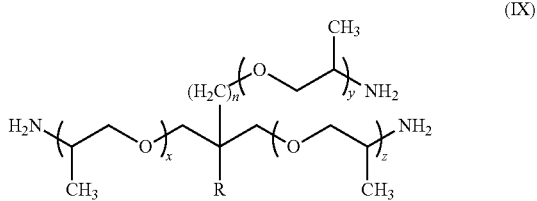

(IX)

in which x, y and z together represent the total number of propylene oxide monomer units present in the branched chain polymer, n is 0 or 1, and R is hydrogen, methyl or ethyl;

or a compound of one of the formulae (V) to (IX) above in which one or more of the $NH_2$ end groups has been converted into a secondary amine group.

11. A method as claimed in claim 10, in which the polyetheramine has the formula (IX), in which the number of moles of polyethylene oxide is between 5 and 6; or in which the polyetheramine has the formula (VI), in which x in the formula (VI) is on average from 6 to 7.

12. A method as claimed in claim 1, in which the membrane-forming polymer is selected from cellulose acetate/triacetate; polyamide; polypiperazine; polybenzimidazoline; polysulfone; polyol; polyacrylonitrile; polyethersulfone; polysulfone; poly(phthalazinone ether sulfone ketone; poly(vinyl butyral); polyvinylidene fluoride; poly (tetrafluoroethylene); polypropylene; polyethylene; and polyetheretherketone.

13. A method as claimed in claim 12, in which the membrane-forming polymer is selected from polysulfone, polyethersulfone, polyvinylidene fluoride, polyacrylonitrile, or polyethylene.

14. A method as claimed in claim 1, in which the solvent used in step (a) is or includes DMF, NMP, dimethylacetamide, acetone, DMSO, or THF.

15. A method as claimed in claim 1, in which step (b) comprises immersing the mixture produced in step (a) in a medium in which the polymer is insoluble.

16. A method as claimed in claim 15, in which said medium is an aqueous medium.

17. A method as claimed in claim 1, in which the membrane obtained in step (b) is subsequently provided with a coating.

* * * * *